Patented June 27, 1933

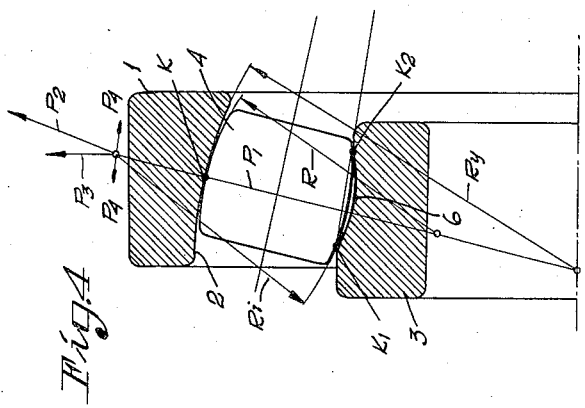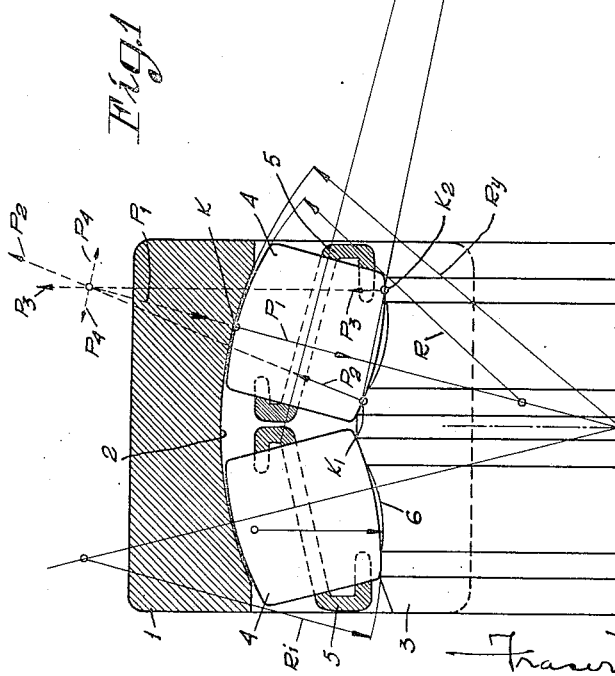

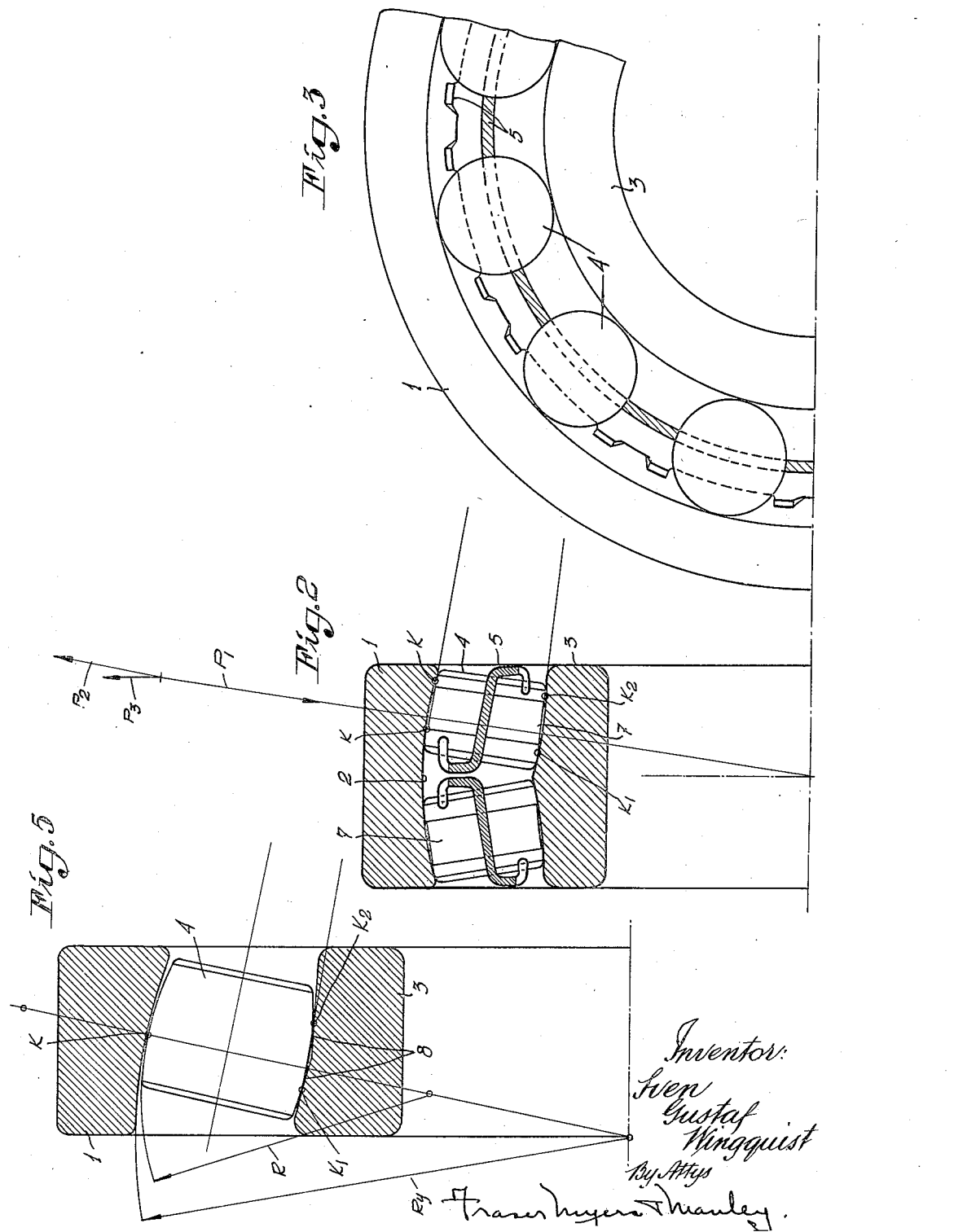

1,915,585

UNITED STATES PATENT OFFICE

SVEN GUSTAF WINGQUIST, OF SKARA, SWEDEN

ROLLER BEARING

Application filed April 1, 1931, Serial No. 526,871, and in Sweden December 2, 1930.

The present invention refers to roller bearings provided with rollers with a convex rolling surface and with more than two rolling contacts between the roller races and each roller.

The invention has for its object to bring about a roller bearing of this type which is simple to manufacture and which has a great loading capacity and long life, and where the stresses on the roller cage provided for the guidance of the rollers are reduced to a minimum value.

The invention consists substantially in the feature that in a roller bearing of the type indicated, where either one of the roller races, preferably the outer one, may be advantageously given a spherical shape so as to make the bearing self-adjusting in a manner known per se, the said rolling contacts between the races and the rollers are so arranged that the pressures acting on each roller at the said contacts will automatically balance or substantially balance each other also in the axial direction of the roller, at a radial as well as an axial load on the bearing. At that race where two rolling contacts are provided between the race and each roller the said contacts may preferably be situated so that their center points will lie on a line intersecting the axis of the bearing in the same point in which the axis of the roller intersects the same. A limit case will be had when the axis of the roller is parallel to the axis of the bearing, in which case the axis of the roller intersects the axis of the bearing at an infinite distance. The axial extension of the rolling contacts should be small in comparison with that of the rolling surface, whereby a practical and satisfactory rolling performance is attained. As is well known, a theoretically proper rolling is not possible to attain in practice by reason of the elasticity, deformation etc. of the material of the races and rollers.

The accompanying drawings illustrate a few forms of embodiment of a roller bearing according to this invention as applied to bearings with a spherical outer race.

Fig. 1 is an axial section of a double-row roller bearing with three rolling contacts for each roller. Fig. 2 is a similar section of a double-row roller bearing with four rolling contacts for each roller. Fig. 3 is an endwise view of the bearing according to Fig. 2, the roller cage being shown in section. Figs. 4 and 5 are axial sections of single-row roller bearings according to two further embodiments.

In all figures of the drawings, 1 designates the outer bearing ring provided with a spherical race 2. 3 is the inner bearing ring and 4 the rollers provided between said rings. The roller cage which is shown in Figs. 1, 2 and 3, and which is made of sheet metal, is denoted by 5.

In the embodiment according to Fig. 1, the generatrix of the mantle surface of the rollers is formed by a circular arc, the radius $R$ of which is smaller than the radius $R_y$ of the outer spherical race 2, so that a rolling contact $K$ is obtained between the roller and the race. The races of the inner bearing ring 3 are likewise generated by a circular arc, the radius $R_1$ of which is equal to the radius $R$ of the roller generatrix, so that a line contact will be produced here between the roller and the race. The axial extension of this line contact is limited here to relatively short distances at the end surfaces of the roller or in the proximity of said end surfaces by the race being turned or ground down to a profile shaped on the lines of circular arcs with the radius $r$, as at 6. Here, the shape of the profile is evidently of no importance. It is important only that the profile of the race be withdrawn here from the roller, so that two separate rolling contacts of comparatively small axial extension are obtained. The center points of these roller contacts are designated by $K_1$ and $K_2$ in the drawings (the right hand half part of the bearing). The said middle points are situated here in such manner that a line through the same intersects the axis of the bearing in the same point $P$ in which the axis of the roller intersects the same, as will be seen from the drawings.

The normal pressures acting on a roller in the rolling contacts $K$, $K_1$ and $K_2$ are designated by $P_1$, $P_2$ and $P_3$ respectively, and, as will be seen from the parallelogram of forces drawn in the figure, the said pressures will, through the arrangement of the rolling contacts shown, balance each other completely, which will also be the case with the forces $P_4$, $P_4$ acting on the roller in the axial direction.

A roller is in a state of equilibrium in a plane extending through its axis and the axis of the bearing, but the roller may be turned about an axis extending toward the axis of the bearing perpendicularly to the axis of the roller. If the outer and inner races be maintained in their concentric positions through the intermediary of the remaining rollers of the bearing and a roller is turned about the said axis, all pressure between the races and the roller gradually ceases, a play being then produced and the roller being unloaded. Thus the equilibrium of the roller is unstable.

Thus, if a roller shows a tendency toward running at different speeds at the two ends or to tilt, it will be unloaded and may be returned into its proper position under the influence of very small forces. The function of keeping the rollers in proper position is performed by the roller cage 5 which is not then subjected to injurious stresses.

In the embodiment above described, three rolling contacts have been obtained for each roller 4, partly by a suitable selection of the radii of curvature for the generatrixes of the races and the mantle surface of the roller, and partly by special shaping of the inner race (the recess 6).

Any desired number of rolling contacts may be obtained by shaping the rollers in a suitable manner.

Such an embodiment is shown in Figs. 2 and 3. The radii of curvature for the generatrixes shaped on the lines of circular arcs and pertaining to the outer and the inner race and to the mantle surface of the rollers are here mutually alike, so that line contact is produced at the inner as well as at the outer race. In order to limit the axial extension of this contact between the races and the rollers 4, the latter are provided with annular recesses 7 between the end portions, so that two rolling contacts $K$, $K$ at the outer race and two rolling contacts $K_1$, $K_2$ at the inner race will be obtained at or near the ends of each roller. Otherwise, the arrangement of these rolling contacts is of the same kind as that described in connection with the embodiment according to Fig. 1, that is to say such that pressure balance will also be had in the axial direction of the roller. Both the contacts $K$, $K$ and the contacts $K_1$, $K_2$ are situated so that their middle points lie on a line intersecting the axis of the bearing in the same point in which the axis of the roller intersects the same.

Fig. 4 shows a single-row roller bearing in accordance with the invention, where the relation between the radii of curvature for the generatrixes of the races and of the mantle surfaces of the rollers is the same as in the embodiment according to Fig. 1, besides which the inner race 3 is here also provided with a recess 6, so that two rolling contacts $K_1$ and $K_2$ are obtained at the inner race and one rolling contact $K$ at the outer spherical race 2.

The embodiment according to Fig. 5 differs from that shown in Fig. 4 only in regard to the shaping of the inner race. Here, the generatrix of this race instead of consisting of a circular arc consists of a broken straight line 8, so that the race is formed by two conical surfaces, on which two rolling contacts $K_1$ and $K_2$ are obtained for each roller.

With respect to the embodiments according to Figs. 4 and 5, the pressure balance above described also holds good in the axial direction, with a radial as well as with an axial loading of the bearing.

What I claim is:—

1. A roller bearing, as defined by claim 8, having a single rolling contact between each roller and the outer race and a pair of spaced rolling contacts between each roller and the inner race.

2. A roller bearing, as defined by claim 8, of which the generatrix of the rolling surface of the rollers is that of a circular arc of smaller radius than that of the spherical surface of the outer race, and of which the generatrix of the effective surface portions of the inner race consists of parts of a circular arc of the same radius as that of the generatrix of the rolling surfaces of the rollers, the bearing having a single rolling contact between each roller and the outer race and a pair of spaced rolling contacts between each roller and the inner race.

3. A roller bearing, as defined by claim 8, of which the single rolling contact is with the spherical race and of which the effective surface portions of the inner race are of such axial cross-sectional form as to be represented by two straight lines which meet at an obtuse angle.

4. A roller bearing comprising inner and outer races and rollers each of which has a single rolling contact with one of said races and two spaced rolling contacts with the other, the effective surface of the outer race being spherical, the generatrix of each roller being an arc of a circle of a radius of curvature not greater than that of the surface of said outer race, and the centers of each pair of spaced contacts between a race and a roller being in a line which intersects the axis of the bearing at substantially the same point as that at which it would be intersected by lines coincident with the axes of the rollers.

5. A roller bearing comprising an outer race of which the effective surface is spherical, rollers of which the generatrix is an arc of a circle of a radius of curvature slightly less than that of the surface of the outer race, and an inner race having spaced effective surfaces of which the generatrix is an arc of a circle of substantially the same curvature as that of the surface of the rollers, whereby each roller will have a single rolling contact with the outer race and a pair of spaced contacts with the inner race, the centers of the contacts between each roller and the inner race being in a line which intersects the axis of the bearing at substantially the same point as that at which it would be intersected by lines coincident with the axes of the rollers.

6. A roller bearing comprising inner and outer races and rollers each of which has two rolling contacts with each of said races, the effective surface of the outer race being spherical, the generatrix of each roller being an arc of a circle of a radius of curvature substantially equal and not greater than that of the surface of said outer race, and the centers of each pair of spaced contacts between a race and a roller being in a line which intersects the axis of the bearing at substantially the same point as that at which it would be intersected by lines coincident with the axes of the rollers.

7. A roller bearing comprising inner and outer races and rollers each of which has a single rolling contact with one of said races and two spaced rolling contacts with the other, the centers of each pair of spaced contacts between a roller and a race being in a line which intersects the axis of the bearing at substantially the same point as that at which it would be intersected by lines coincident with the axes of the rollers, the axial cross-sectional form of each of the race-contacting portions of said rollers being convex, and the various contacts being so disposed that the resultant of the normal force or forces between each race and each roller shall be localized along a line passing through a contact or between a pair of spaced contacts between said roller and the other race.

8. A roller bearing comprising an inner race, an outer race having a spherical internal surface, and rollers each of which has a single localized rolling contact with one of said races and two spaced localized rolling contacts with the other, the axial extent of each contact being small as compared with the length of the roller, the axial cross-sectional form of each of the race-contacting portions of said rollers being convex, and the various contacts being so disposed that the resultant of the normal force or forces between each race and each roller shall be localized along a line passing through a contact or between a pair of spaced contacts between said roller and the other race.

9. A roller bearing comprising an inner race having a concave outer surface, an outer race having a spherical internal surface and rollers each of which has a pair of spaced, localized, convex rolling contacts with each of said races, the axial extent of each contact being small as compared with the length of the rollers, the generatrix of the effective surface of the inner race being a circular arc of the radius of curvature of the spherical surface of the outer race, the generatrix of the rolling surfaces of the rollers consisting of an arc of the same radius of curvature as that of the effective surfaces of the races and the various contacts between the rollers and the races being so disposed that the resultant of the normal forces between each race and each roller shall be located along a line passing between a pair of spaced contacts between said roller and the other race.

SVEN GUSTAF WINGQUIST.